(12) United States Patent
Shah et al.

(10) Patent No.: US 7,562,158 B2
(45) Date of Patent: Jul. 14, 2009

(54) MESSAGE CONTEXT BASED TCP TRANSMISSION

(75) Inventors: Hemal V. Shah, Austin, TX (US); Gary Y. Tsao, Austin, TX (US); Ashish V. Choubal, Austin, TX (US); Harlan T. Beverly, McDade, TX (US); Christopher T. Foulds, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 949 days.

(21) Appl. No.: 10/809,077

(22) Filed: Mar. 24, 2004

(65) Prior Publication Data

US 2005/0216597 A1   Sep. 29, 2005

(51) Int. Cl.
*G06F 15/16* (2006.01)
(52) U.S. Cl. ...................................... 709/250
(58) Field of Classification Search .................. 709/250
See application file for complete search history.

(56) References Cited

U.S. PATENT DOCUMENTS

| 6,208,620 | B1 | 3/2001 | Sen et al. |
| 6,282,172 | B1 | 8/2001 | Robles et al. |
| 6,553,032 | B1 | 4/2003 | Farley et al. |
| 6,996,070 | B2 * | 2/2006 | Starr et al. ................... 370/252 |
| 7,017,042 | B1 * | 3/2006 | Ziai et al. .................... 713/161 |
| 7,224,692 | B2 * | 5/2007 | Fan ........................... 370/394 |
| 2002/0156927 | A1 | 10/2002 | Boucher et al. |
| 2004/0042464 | A1 | 3/2004 | Elzur et al. |
| 2004/0042483 | A1 | 3/2004 | Elzur et al. |

\* cited by examiner

*Primary Examiner*—Larry D Donaghue
(74) *Attorney, Agent, or Firm*—Blakely, Sokoloff, Taylor & Zafman LLP

(57) ABSTRACT

A method and system for transmitting packets. Packets may be transmitted when a protocol control block is copied from a host processing system to a network protocol offload engine. Message information that contains packet payload addresses may be provided to the network protocol offload engine to generate a plurality of message contexts in the offload engine. With the message contexts, protocol processing may be performed at the offload engine while leaving the packet payload in the host memory. Thus, packet payloads may be transmitted directly from the host memory to a network communication link during transmission of the packets by the offload engine. Other embodiments are also described.

18 Claims, 5 Drawing Sheets

MESSAGE CONTEXT BASED TCP TRANSMISSION

BACKGROUND

Specific matter disclosed herein relates to the field of computer networking. Networks enable computers and other devices to communicate. For example, networks can carry data representing video, audio, e-mail, and so forth. Typically, data sent across a network is divided into smaller units known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols cooperate to handle the complexity of network communication. For example, a protocol known as Transmission Control Protocol (TCP) provides "connection" services that enable remote applications to communicate. That is, much like picking up a telephone and assuming the phone company will make everything in-between work, TCP provides applications with simple primitives for establishing a connection (e.g., CONNECT and CLOSE) and transferring data (e.g., SEND and RECEIVE). Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. The payload of a segment carries a portion of a stream of data sent across a network. A receiver can restore the original stream of data by collecting the received segments.

Potentially, segments may not arrive at their destination in their proper order, if at all. For example, different segments may travel very different paths across a network. Thus, TCP assigns a sequence number to each data byte transmitted. This enables a receiver to reassemble the bytes in the correct order. Additionally, since every byte is sequenced, each byte can be acknowledged to confirm successful transmission.

Many computer systems and other devices feature host processors (e.g., general purpose Central Processing Units (CPUs)) that handle a wide variety of computing tasks. Often these tasks include handling network traffic. The increases in network traffic and connection speeds have placed growing demands on host processor resources. To at least partially alleviate this burden, a network protocol off-load engine can off-load different network protocol operations from the host processors. For example, a TCP Off-Load Engine (TOE) may perform one or more TCP operations for sent/received TCP segments, e.g., during packet transmissions, a TOE would buffer into its local memory the TCP payload for TCP packet transmissions. This required an additional store-and-forward stage in the TOE for the TCP transmission purpose. This intermediate buffering resulted in an additional latency in the TCP transmission path and an additional load on the TOE memory subsystem.

BRIEF DESCRIPTION OF DRAWINGS

Embodiments of the invention may best be understood by referring to the following description and accompanying drawings that are used to illustrate certain embodiments of the invention. In the drawings.

DETAILED DESCRIPTION

In the following description, specific matter disclosed herein relates to the field of offload engines for a system and method for message context based TCP (Transmission Control Protocol) transmissions/retransmissions (for ease of understanding referred to herein only as "transmissions"). "Message context based" TCP transmissions may be defined as TCP transmissions at an offload engine using message contexts representing TCP payloads rather than the actual TCP payloads. Only a protocol control block for processing TCP transmission instructions (e.g., for generating TCP headers) may necessarily be copied or offloaded to the offload engine. TCP data to be transmitted by the offload engine may be stored in a host memory until the TCP transmission occurs. Subsequently, the TCP data may be moved from a transmit buffer in the host memory to payload in a TCP segment of the TCP transmission where header information was calculated from the protocol control block that was copied to the offload engine. Specific details of exemplary embodiments of the present invention are set forth. However, it is understood that embodiments of the invention may be practiced without these specific details.

The phrase "cut-through transmissions" as used herein refers to a technique that avoids memory to memory copying in data transmissions. Cut-through transmissions may pass messages by reference through multiple protocol layers to avoid memory to memory copying for processing at each protocol layer. However, this is merely an example of cut-through transmissions and embodiments of the present invention are not limited in this respect.

The phrase "message context" as used herein refers to information that indicates the location/address of a packet payload in a memory. However, this is merely an example of a message context and embodiments of the present invention are not limited in this respect.

The phrase "network communication link" as used herein refers to a link for signals to be transmitted onto a network, i.e., a means for accessing any one of several entities coupled to a communication network, e.g., unshielded twisted pair wire, coaxial cable, fiber optic, etc. However, this is merely an example of a network communication link and embodiments of the present invention are not limited in this respect.

Figure 1:
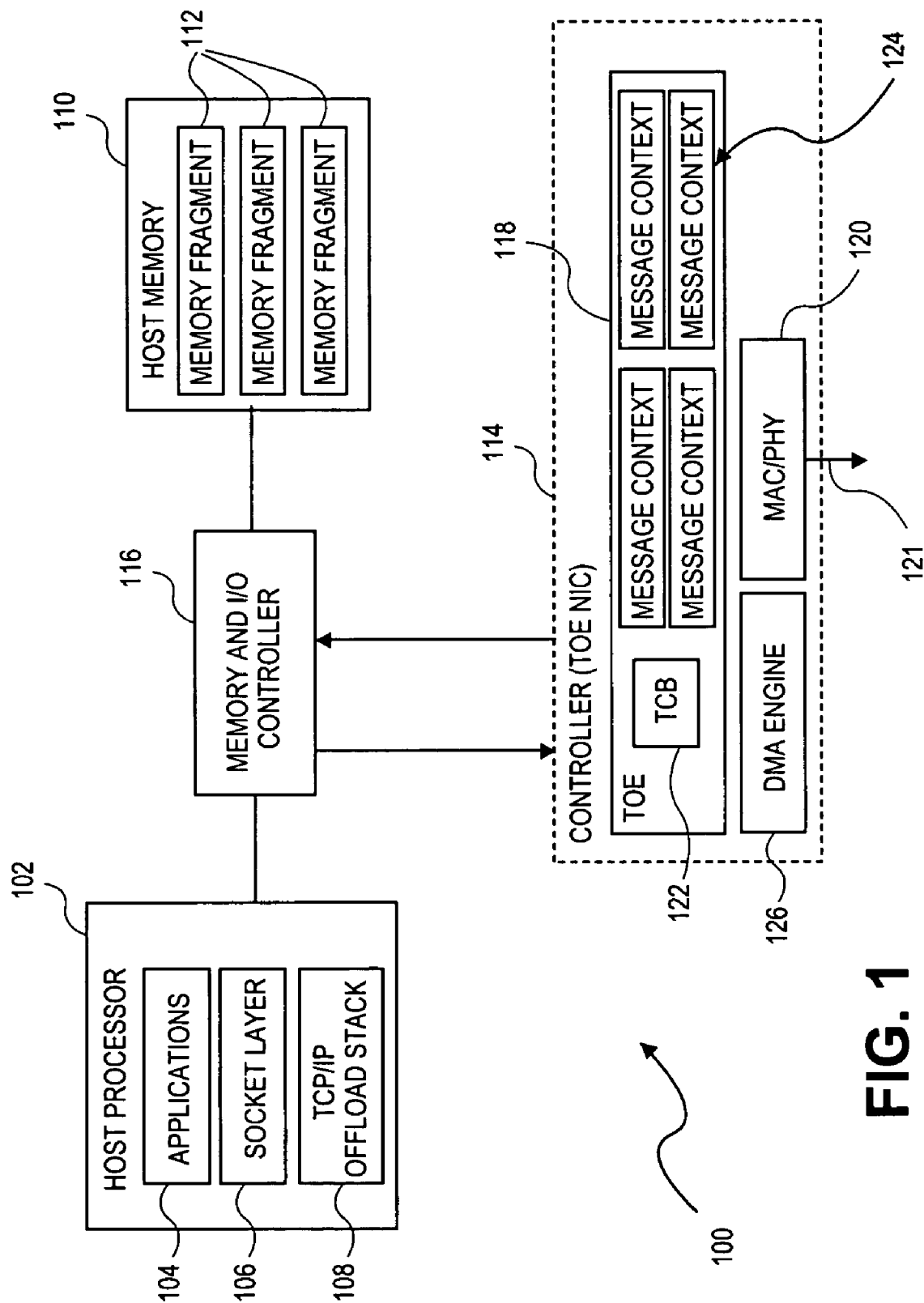
FIG. 1 illustrates a system according to an exemplary embodiment.

FIG. 1 illustrates a system 100 according to an exemplary embodiment. The system 100 includes a host processor 102 illustrated as having various host elements being processed, e.g., applications 104. The applications 104 may make use of other host elements such as a socket layer 106 and/or a TCP/IP offload stack 108. The host elements interoperate with a host memory 110 that includes, among other things, memory fragments 112 that may become the payload of different packets in packet transmissions.

The packets may be organized to make up, among other things, a TCP segment. A TOE NIC (TOE Network Interface Controller) 114 is illustrated communicating with the host processor 102 and host memory 110 during TCP communications.

A memory and I/O (input/output) controller 116 acts as the interface between the host processor 102 and the host memory 110 as well as the interface between the host processor 102 and the TOE NIC 114. Thus, the memory and I/O controller 116 provides the host processor 102 with the ability to utilize the TOE NIC 114 operations as they relate to host memory 110 during packet transmissions.

The illustrated embodiment TOE NIC 114 may transmit the TCP payload directly from host memory 110 without the need for intermediate buffering of the TCP payload by the TOE NIC 114, thus eliminating overheads associated with a store-and-forward stage in the TCP transmission path in a TOE.

In the illustrated embodiment, TOE NIC 114 includes TOE 118 for, among other things, organization of TCP segments to be transmitted via MAC/PHY (medium access control)/(physical layer)120 on a network communication link 121. Among other types of link, the network communication link 121 may operate according to different physical specifications or network protocols, e.g., the link 121 may operate according to communication standards such as IEEE Std. 802.3, IEEE Std. 802.11, IEEE Std. 802.16, etc. and be an Ethernet link, a wireless link, etc. implemented with a media such as fiber, unshielded twisted pair, etc.

The TCP segments are generated based on the information found in a TCP Connection Block (TCB) 122 that may be copied to the TOE 118 from the host processor 102. The TCB 122 may be used to organize message contexts 124 that contain message information for generating payloads for different TCP segments that are to be transmitted. This message information may facilitate TOE 118 creation of many different headers for packet transmissions such as TCP headers, IP headers, and Ethernet headers.

As described in more detail below, the TOE NIC 114 may also include a Direct Memory Access (DMA) engine 126 for the direct memory transfers of packet payloads from host memory 110 to the network communication link to avoid store and forward operations.

Each message context 124 may include information such as the length of the message to be transmitted and the addresses of memory fragments 112 that make up the message buffer. For each message, the host processor 102 passes information describing the location of the relevant memory fragments 112 in the host system memory 110 that make up a message buffer. The message buffer may be used by the TOE 118 until the entire message buffer is delivered on the network. The host processor 102 may ensure that the message buffer resides in the host system memory 110 at the location described in the message contexts 124 until the message buffer is transmitted and acknowledged as directed by the message contexts 124 of the TOE NIC 114. In turn, each message is transmitted via TCP in the form of one or more TCP segments where the TCP header is formed based on information found in the TCB 122, and the TCP segment payload is accessed in a DMA transaction with the address information stored in one or more of the message contexts 124.

In other words, during the transmission from the TOE NIC 114, the headers of the TCP segments are formed from the TCB 122 and the TCP segments receive their payloads via DMA from the host system memory 110 to the network communication link based on information found in the message contexts 124 (e.g., cut-through transmissions). Thus, copying of the TCP segment payloads to a TOE NIC 114 is avoided with the TOE 118 because the payloads remain in host system memory 110 until transmission of the TCP segment, i.e., during TCP transmissions, the information stored in the message contexts 124 is used to allow the TCP payloads to remain in host memory 110 until transmission of the TCP segment.

Figure 2:
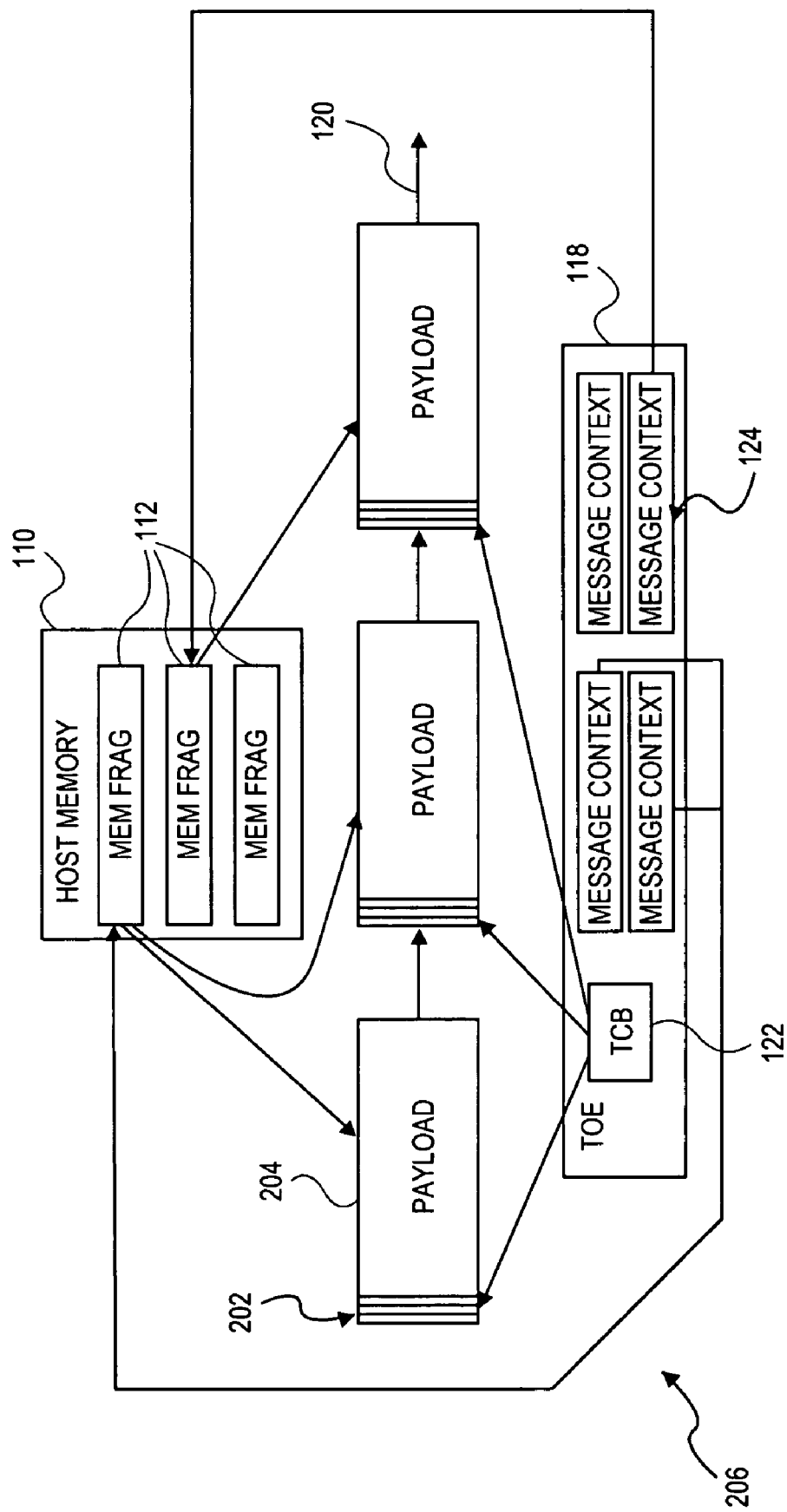
FIG. 2 illustrates relationships among portions of the system of FIG. 1 as they relate to packet formation and transmission according to an embodiment of the present invention.

FIG. 2 illustrates relationships among certain portions of the system 100 as they relate to packet formation and transmission. For each offloaded TCP connection, the TOE 118 may maintain a virtual transmit buffer that is described by a linked list of the message contexts 124. For example, during the transmission of a TCP segment, the TOE 118 may prepare a TCP, IP, Ethernet, etc. header 202 of the segment from the TCB 122. To complete formation of the TCP segment, the TOE 118 DMA copies the TCP segment payload 204 based on the buffer address information contained in one or more of the message contexts 124 spanning the TCP segment. With header 202 and payload 204, the TCP segment 206 may be transmitted on the network communication link 121.

Upon receiving a TCP acknowledgement (ACK) acknowledging the successful transmission of the TCP segments with the data described by the relevant message contexts 124, the TOE 118 may complete the transmission of the messages by reporting the message completions to the host stack of the host processor 102. The TCB 122 containing the TCP connection state may be maintained by the TOE 118 for the offloaded connection.

Figure 3:
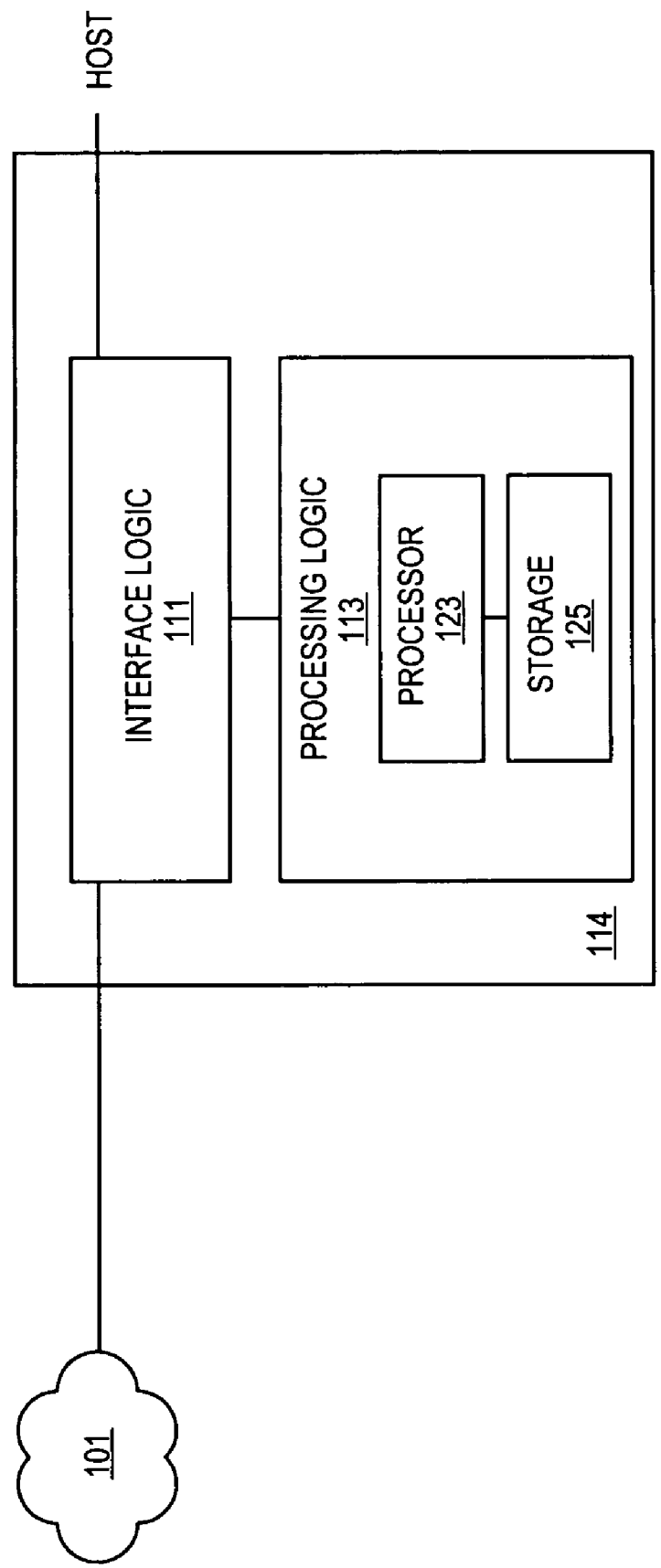
FIG. 3 illustrates other aspects of a TOE NIC according to an embodiment of the system of FIG. 1.

FIG. 3 illustrates other aspects of the TOE NIC 114. Although many computer systems feature processors that handle a wide variety of tasks, as described above, the TOE NIC 114 may have the responsibility of handling network traffic. TOE NIC 114 may perform network protocol operations for a host to at least partially reduce the burden of network communication on a host processor. As stated earlier, the TOE NIC 114 may perform operations for a wide variety of protocols. For example, the TOE NIC 114 may be configured to perform operations for transport layer protocols (e.g., TCP and User Datagram Protocol (UDP)), network layer protocols (e.g., IP), and application layer protocols (e.g., sockets programming).

In addition to conserving host processor resources by handling protocol operations, the TOE NIC 114 may provide "wire-speed" processing, even for very fast connections such as 10-gigabit per second connections. In other words, the TOE NIC 114 may, generally, complete processing of one packet before another arrives. By keeping pace with a high-speed connection, the TOE NIC 114 can potentially avoid or reduce the cost and complexity associated with queuing large volumes of backlogged packets.

The sample TOE NIC 114 shown may include an interface 111 for transmitting data traveling between one or more hosts and a network 101. The TOE NIC 114 interface 111 transmits data from the host(s) and generates packets for network transmission, for example, via a PHY and MAC device (see MAC/PHY 120 from FIG. 1) offering a network connection (e.g., an Ethernet or wireless connection).

In addition to the interface 111, the TOE NIC 114 also includes processing logic 113 that implements protocol operations. Like the interface 111, the logic 113 may be designed using a wide variety of techniques. For example, the TOE NIC 114 may be designed as a hard-wired ASIC (Application Specific Integrated Circuit), a FPGA (Field Programmable Gate Array), and/or as another combination of digital logic gates.

As shown, the logic 113 may also be implemented by a TOE NIC 114 that includes a processor 123 (e.g., a microcontroller or micro-processor) and storage 125 (e.g., ROM (Read-Only Memory) or RAM (Random Access Memory)) for instructions that the processor 123 can execute to perform network protocol operations. The instruction-based TOE NIC 114 offers a high degree of flexibility. For example, as a network protocol undergoes changes or is replaced, the TOE NIC 114 can be updated by replacing the instructions instead of replacing the TOE NIC 114 itself. For example, a host may update the TOE NIC 114 by loading instructions into storage 125 from external FLASH memory or ROM on the motherboard, for instance, when the host boots.

Though FIG. 3 depicts a single TOE NIC 114 performing operations for a host, a number of off-load engines 114 may be used to handle network operations for a host to provide a scalable approach to handling increasing traffic. For example, a system may include a collection of engines 114 and logic for allocating connections to different engines 114. To conserve power, such allocation may be performed to reduce the number of engines 114 actively supporting on-going connections at a given time.

In operation, for example, as described herein for the TCP protocol, communication information known as TCB data (see TCB 122) may be processed for a given network connection. For a given packet, the TOE NIC 114 looks-up the corresponding connection context in the memory and makes this connection information available to the processor 123, e.g., via a working register (not shown). Using context data, the processor 123 executes an appropriate set of protocol implementation instructions from storage125. Context data, potentially modified by the processor 123, may be returned to the appropriate message context 124 for DMA transmission.

The TOE NIC 114 may perform protocol operations for the packet, for example, by processor 123 execution of protocol implementation instructions stored in storage 125. The processor 123 may determine the state of the current connection and identify the starting address of instructions for handling this state. The processor 123 then executes the instructions beginning at the starting address. Depending on the instructions, the processor 123 may alter context data (e.g., by altering the working register). Again, context data, potentially modified by the processor 123, is returned to the appropriate message context 124.

Figure 4:
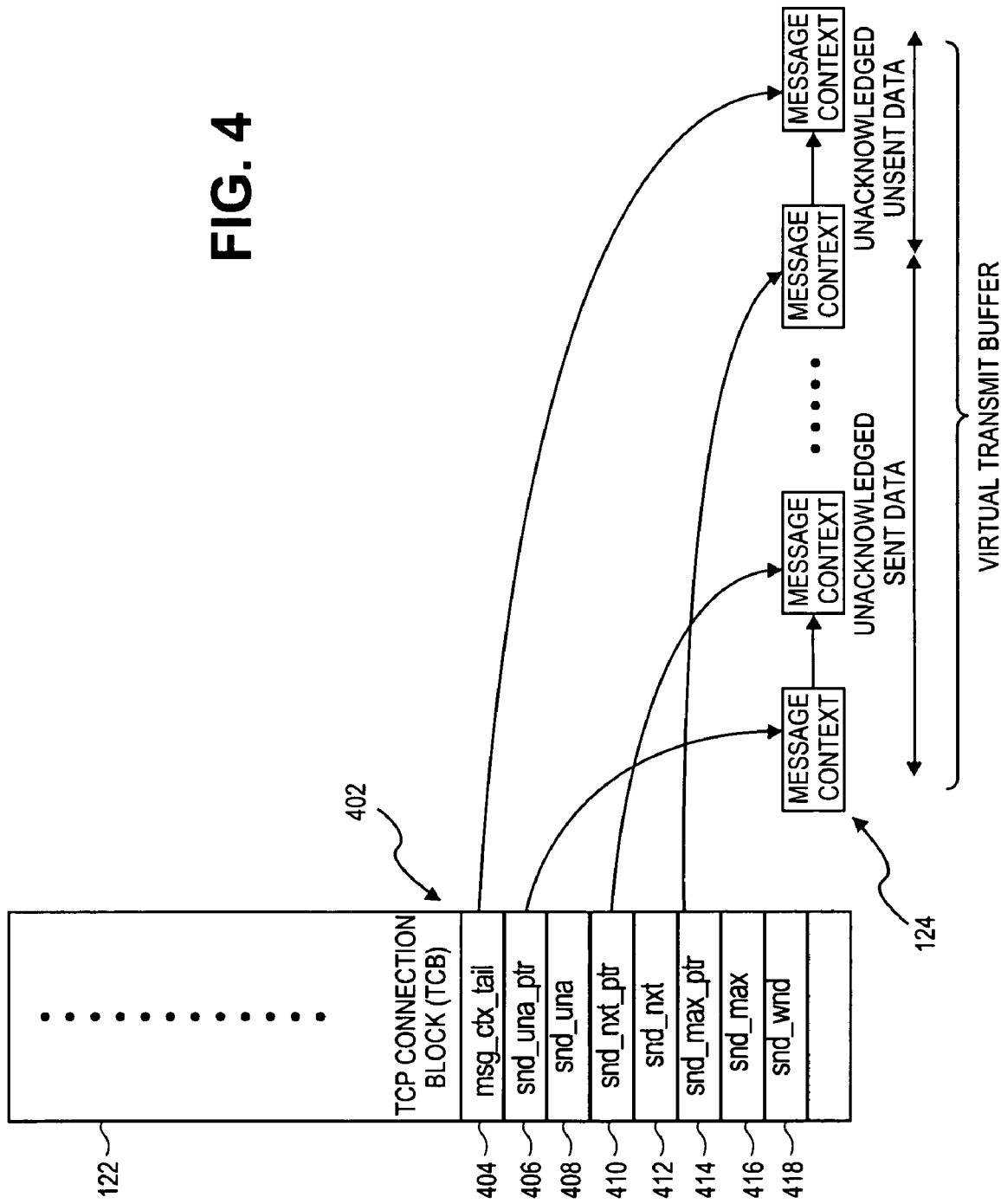
FIG. 4 illustrates an example of TCB variables and their relationship to the message contexts according to an embodiment of the system of FIG. 1.

FIG. 4 illustrates an example of message context related TCB fields 402 maintained by the TOE 118, and their relationship to the message contexts 124. The TOE NIC 114 may maintain the TCB 122 with the illustrated TCB fields 402, e.g., msg_ctx_tail 404, snd_una_ptr 406, snd_una 408, snd_nxt_ptr 410, snd_nxt 412, snd_max_ptr 414, snd_max 416, and snd_wnd 418. The message context related TCB fields 402 maintained by the TOE 118 of the TOE NIC 114 for the TCP transmissions per connection are described briefly as follows, the pointer fields of FIG. 4 being illustrated with arrows pointing to a respective one of the message contexts 124:

msg_ctx_tail—Pointer to the tail of the linked list of message contexts
snd_una_ptr—Pointer to the message context that contains the location of the first unacknowledged byte (this is also the head of the linked list of message contexts)
snd_una—Sequence number of the first unacknowledged byte
snd_nxt ptr—Pointer to the message context that contains the location of the payload to be sent next (also pointer to the head of the linked list of message contexts)
snd_nxt—Sequence number of the first byte to be sent next
snd_max ptr—Pointer to the message context that contains the location of byte with the highest sequence number sent
snd_max—Highest sequence number sent In operation, for each send message, the host stack passes an identifier for the offloaded TCP connection (tcb_id) on which the data is to be transmitted, a list of scatter-gather elements (SGEs) describing the host system memory fragments of the message buffer, the number of SGEs in the message buffer, a flag describing whether no completion response is required for this message (flag_nr), and the length of the message to the TOE. Procedurally, the send message can be described as the following:

toe_sendmsg(tcb_id, flag_nr, msg_len, num_frags, frag_addr[ ], frag_len[ ]), where
tcb_id—TCP connection identifier
flag_nr—No response flag
msg_len—Total length of the message
num_frags—Number of memory fragments
frag_addr[ ]—Array of the starting memory addresses of the fragments
frag_len[ ]—Array of the lengths of the fragments The TOE may store the send message information in one or more message contexts, e.g., the message contexts 124. A message context may contain the following fields:

msg_startseq—TCP sequence number associated with the first payload byte of this message context
msg_num_frags—Number of memory fragments contained in this message context
msg_frag_addr[ ]—Array of the starting memory addresses of the fragments contained in this message context
msg frag_len[ ]—Array of the lengths of the fragments contained in this message context
msg_flag_nr—No response flag
msg_len—Total length of the payload bytes described by this message context Procedurally, the TOE 118 provides the following completion notification for the send messages:

toe_sendmsg completion(tcb_id, num_msgs), where
tcb_id—TCP connection identifier
num_msgs—Number of completed messages with no response flag set to 0

With this scheme, the host 102 may transfer control of the send message buffer to the TOE 118 upon submission of the send message and the TOE 118 may return control of the send message buffer to the host 102 upon completion of the send message.

Upon receiving a send message command, the TOE NIC 114 performs the steps described in the following pseudo-code where error handling has been simplified for ease of understanding. Other similar algorithms may be constructed to accomplish the same tasks:

```
if (msg_ctx_tail->msg_flag_nr ==1 &&
 the message can fit into the message context pointed by msg_ctx_tail)
{
  Update the message context pointed by msg_ctx_tail with the
information for this send message;
  if (flag_nr == 0)
     msg_ctx_tail->msg_flag_nr = 0;
}
else
{
  Determine the number of message contexts (req_msg_ctxs) needed for
this message;
   Wait for req_msg_ctxs numbers of message contexts to be available;
   Obtain req_msg_ctxs numbers of message contexts;
   Store the send message information in the new message contexts;
   if (req_msg_ctxs > 1)
     For each of the first req_msg_ctxs-1 numbers of new message
contexts set msg_flag_nr to 1;
   Set msg_flag_nr of the last message context to flag_nr;
   Update msg_ctx_tail & message context list by adding the new
message contexts to the end of the list;
   Update snd_una_ptr, snd_nxt_ptr, and snd_max_ptr if necessary;
}
```

The TCP transmission scheme for the TOE NIC 114 when using message contexts 124 may be described by the following pseudo-code:

```
tcp_output(tcb)
{
  Determine the length of the data to be transmitted;
  While (the data is not transmitted)
  {
    Compute the length of the next TCP segment to be transmitted;
    Construct TCP/IP headers for this TCP segment;
    Construct memory fragment list describing the TCP segment payload
    from one or more message contexts starting with the message context
    pointed by snd_nxt_ptr;
    DMA TCP segment payload based on the constructed memory
    fragment list;
    Transmit TCP segment;
    Update TCB variables including snd_nxt_ptr, snd_nxt, snd_max (if
    necessary), and snd_max_ptr (if necessary);
  }
}
```

Upon receiving a TCP ACK for the TCP segment, the following processing may be performed by the TOE NIC 114 for the send message completion command that may be sent to the host processor 102:

```
if (new data is being acked)
{
  Based on the snd_una of TCB and ACK field of the TCP header,
  compute the number of new bytes being ACKed;
  Starting with snd_una_ptr, compute the number of message contexts
  (num_msgs) with msg_flag_nr set to 0 are completely ACKed;
  Free message contexts which are completely ACKed by this TCP ACK;
  Update TCB variables including snd_una and snd_una_ptr
  (snd_una_ptr now points to the message context
  which contains the first unacknowledged TCP payload byte);
  If the number of ACKed message contexts (num_msgs) with
  msg_flag_nr set to 0 is greater than 1, then notify send message
  completion to the host stack with num_msgs count;
  Update msg_ctx_tail if necessary;
}
```

The host stack tracks the outstanding send messages per connection. Based on the num_msgs count it receives in the send completion notification from the TOE NIC 114, the host stack may complete one or more buffers associated with the send message(s).

Figure 5:
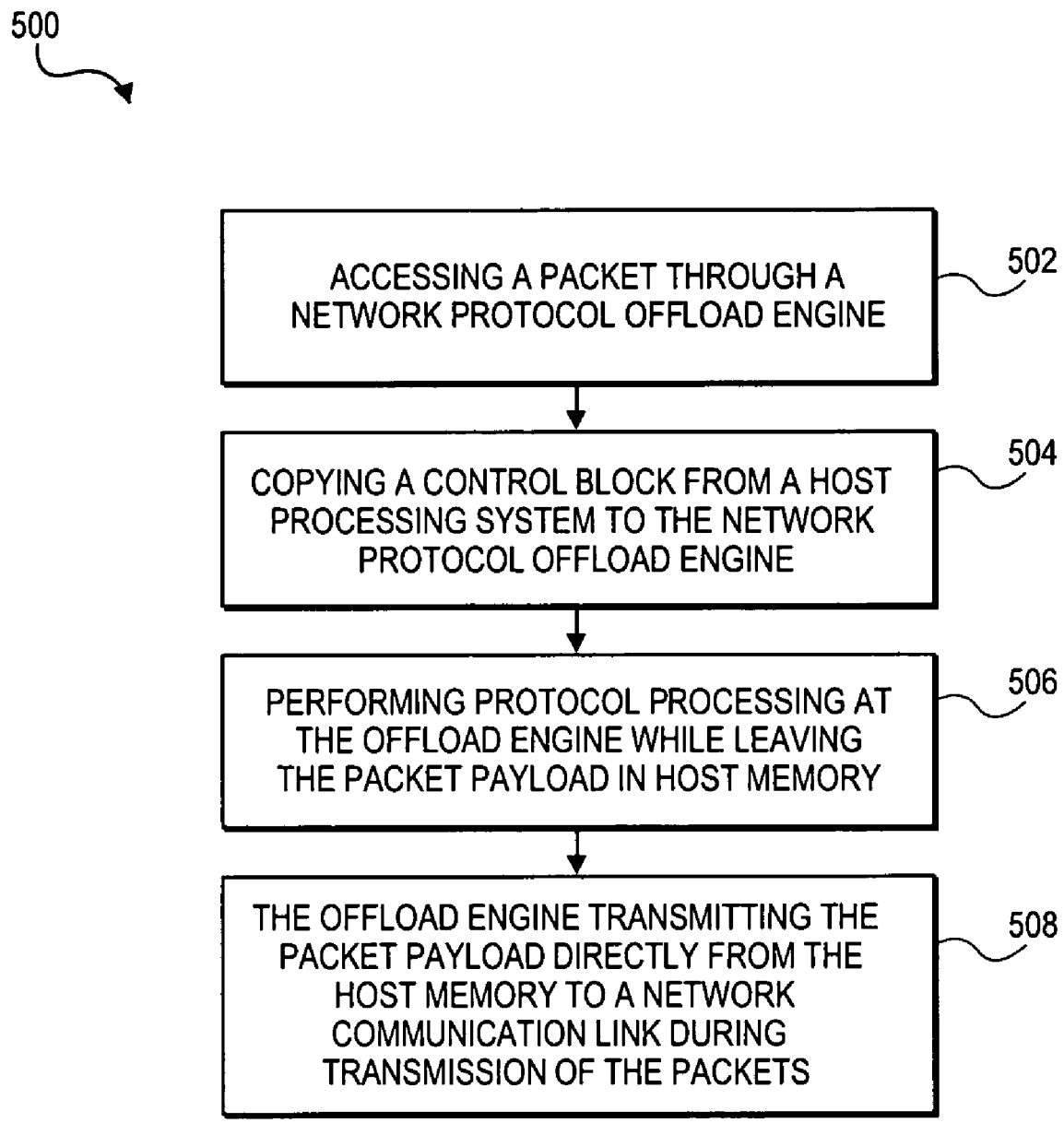
FIG. 5 illustrates a method for transmitting packets according to an embodiment of the system of FIG. 1.

FIG. 5 illustrates a method 500 for transmitting packets in the system 100. In step 502, packets are accessed through a network protocol engine such as TOE NIC 114. In step 504, a control block is copied from a host processing system to the network protocol engine. In step 506, processing of the control block may be used to generate header information for the packets to be transmitted at the offload engine while leaving the packet payloads in host memory. As described in more detail in relation to FIG. 2, the message contexts 124 may be used to locate packet payloads for the headers that are generated from the TCB 122 for the packets 206. In step 508, the offload engine transmits the packet payload directly from the host memory to a network communication link during transmission of the packets. Among other things, this payload transmission avoids the additional overhead required by a store and forward or other memory copying operation.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the invention has been described in terms of several embodiments, those of ordinary skill in the art should recognize that the invention is not limited to the embodiments described, but can be practiced with modification and alteration within the spirit and scope of the appended claims. The description is thus to be regarded as illustrative instead of limiting.

What is claimed is:

1. A method of transmitting packets comprising:
   copying a protocol control block from a host processing system to a network protocol offload engine;
   providing message information to the network protocol offload engine, the message information containing a message buffer location in a host memory;
   generating one or more message contexts in the offload engine from the message information to indicate the message buffer location rather than copying the message buffer to the offload engine;
   performing protocol processing at the offload engine while leaving the message buffer in the host memory; and
   transmitting the message buffer in the form of at least one packet payload directly from the host memory to a network communication link, without intermediate buffering of the at least one packet payload by the offload engine, during transmission of packets by the offload engine.

2. The method of claim 1 wherein said transmitting the message buffer comprises retrieving the message buffer from the host memory via cut-through transmissions.

3. The method of claim 2 wherein said cut-through transmissions comprise direct memory access copies.

4. The method of claim 1 wherein said performing protocol processing comprises processing TCP segments.

5. The method of claim 4 wherein said performing protocol processing comprises generating TCP headers for the TCP segments.

6. The method of claim 1 further comprising freeing the one or more message contexts upon acknowledgement of the packet payload delivery.

7. The method of claim 1 further comprising providing message completion information to the host processing system to release message buffers containing the packet payload.

8. The method of claim 1 wherein said performing protocol processing comprises processing machine-readable instructions stored in a storage medium.

9. A network offload engine comprising:
   a first interface to a host processor to receive a copy of a transmission control protocol block;
   a second interface to a communication link to copy packet payloads from a host buffer onto the communication link; and
   an engine to perform protocol processing with information from the transmission control protocol block and additional information concerning a location of the packet payloads in the host buffer, the engine to create and to send packets on the communication link according to the protocol processing with the information from the transmission control protocol block and the additional information concerning the location of the packet payloads in the host buffer while leaving the packet payloads in the host buffer, the packet payloads being directly copied from the host buffer to the communication link, without intermediate buffering of the packet payloads within the engine, to complete packet transmissions.

10. The network offload engine of claim 9 wherein the additional information concerning the location of the packet payloads in the host buffer comprises at least one message context.

11. The network offload engine of claim 9 wherein the communication link comprises unshielded twisted pair wire for Ethernet communications.

12. The network offload engine of claim 9 wherein the direct copy of the packet payloads from the host buffer comprises a cut-through transmission of the packet payloads to the communication link of the network offload engine.

13. The network offload engine of claim 12 wherein the copy of the packet payloads from the host buffer comprises a direct memory access engine to copy the packet payloads from the host buffer.

14. An article comprising:
a storage medium comprising machine-readable instructions stored thereon to: perform protocol processing at an offload engine while leaving a packet payload of a packet in a host memory;
access one or more message contexts that contain the packet payload address from the host memory to complete the protocol processing; and
transmit the packet payload directly from the host memory to a communication link, without intermediate buffering of the packet payload within the offload engine, during transmission of the packets by the offload engine.

15. The article of claim 14 wherein the storage medium further comprises machine-readable instructions to free message contexts upon receiving an acknowledgement of payload delivery.

16. The article of claim 15 wherein the storage medium further comprises machine-readable instructions to instruct the host processing system to release message buffers of the host memory upon receiving the acknowledgement of payload delivery.

17. The article of claim 14 wherein the storage medium further comprises machine-readable instructions to instruct the host processing system to perform protocol processing for TCP segments.

18. The article of claim 17 wherein the storage medium further comprises machine-readable instructions to instruct the host processing system to generate a TCP header for the TCP segments.

* * * * *